US012247260B2

(12) United States Patent
Mamat

(10) Patent No.: US 12,247,260 B2
(45) Date of Patent: Mar. 11, 2025

(54) SUSTAINABLE SCRAP LEATHER REUSING AND PROCESS THEREOF

(71) Applicant: K H EXPORTS INDIA PRIVATE LIMITED, Chennai (IN)

(72) Inventor: Omer Suat Mamat, Chennai (IN)

(73) Assignee: K H EXPORTS INDIA PRIVATE LIMITED, Chennai (IN)

( * ) Notice: Subject to any disclaimer, the term of this patent is extended or adjusted under 35 U.S.C. 154(b) by 0 days.

(21) Appl. No.: 18/246,750

(22) PCT Filed: Jul. 20, 2022

(86) PCT No.: PCT/IN2022/050653

§ 371 (c)(1),
(2) Date: Mar. 27, 2023

(87) PCT Pub. No.: WO2023/166516

PCT Pub. Date: Sep. 7, 2023

(65) Prior Publication Data

US 2024/0301522 A1 Sep. 12, 2024

(30) Foreign Application Priority Data

Mar. 3, 2022 (IN) ............................. 202241011402

(51) Int. Cl.
*C14B 7/04* (2006.01)

(52) U.S. Cl.
CPC ..................................... *C14B 7/04* (2013.01)

(58) Field of Classification Search
None
See application file for complete search history.

(56) References Cited

U.S. PATENT DOCUMENTS

| | | | | |
|---|---|---|---|---|
| 5,028,285 A * | 7/1991 | Wyler | C14B 7/04 156/308.2 |
| 11,214,844 B2 * | 1/2022 | Purcell | C14C 7/00 |
| 2014/0311193 A1 * | 10/2014 | Greene | B32B 9/025 69/21 |
| 2018/0094329 A1 * | 4/2018 | Kim | C14B 7/02 |
| 2022/0074005 A1 * | 3/2022 | Mytaros | C14B 7/04 |

(Continued)

FOREIGN PATENT DOCUMENTS

| | | | |
|---|---|---|---|
| JP | 2000289142 A | 10/2000 | |
| KR | 101333133 B1 * | 4/2013 | C14B 1/30 |
| KR | 101584171 B1 | 1/2016 | |

(Continued)

OTHER PUBLICATIONS

International Search Report & Written Opinion dated Nov. 24, 2022 from PCT Application No. PCT/IN2022/050653.

(Continued)

*Primary Examiner* — Jocelyn Bravo
(74) *Attorney, Agent, or Firm* — INNOVATION CAPITAL LAW GROUP, LLP; Vic Lin

(57) ABSTRACT

The present invention relates to scrap leather re use which is fully based on sustainable and the process of enhancing leather wastage and scrap into beautiful leather product. More particularly, the present invention relates to converting leather scrap into leather sheet with the help of glue. Further, the present invention effectively saves wastage of leather and save environment from the pollution.

4 Claims, 3 Drawing Sheets

(56) References Cited

U.S. PATENT DOCUMENTS

| | | | | |
|---|---|---|---|---|
| 2023/0145310 A1* | 5/2023 | Querci | ...................... | C14B 7/04 428/297.4 |
| 2024/0018613 A1* | 1/2024 | Eom | ........................ | D02G 3/10 |

FOREIGN PATENT DOCUMENTS

| | | | | |
|---|---|---|---|---|
| KR | 1752176 B1 * | 7/2017 | ............... | C14B 1/02 |
| KR | 101752176 B1 | 7/2017 | | |
| KR | 20170096093 A | 8/2017 | | |
| KR | 101996175 B1 | 7/2019 | | |

OTHER PUBLICATIONS

Marconi, Marco, et al. "Reuse of leather scraps for insulation panels: Technical and environmental feasibility evaluation." Procedia CIRP 90 (2020): 55-60. https://doi.org/10.1016/j.procir.2020.01.053, Aug. 6, 2020 (Aug. 6, 2020).

* cited by examiner

SUSTAINABLE SCRAP LEATHER REUSING AND PROCESS THEREOF

FIELD OF THE INVENTION

The present invention generally relates to the field of leather processing. The present invention relates to the process of sustainable scrap leather reusing. More particularly, converting a waste leather scrap into a leather sheet using biodegradable water-based glue.

BACKGROUND OF THE INVENTION

Natural leather is a tough skin that envelops the body of an animal. Due to its excellent properties, it is widely used in various fields such as bags, shoes, and furniture. Natural leather is separated from the animal's body and then made into a product through chemical and physical processes. It is necessary to cut the product in accordance with the design of the desired product during the various stages of processing. However, a large amount of leather waste is generated through the cutting process, and most of the leather waste is disposed of by incineration and land filling, thereby causing serious environmental problems.

Various research has been carried out to recycle incineration and land filled leather waste, and techniques have been developed to crush leather waste and manufacture artificial leather using synthetic resin adhesives.

However, the prior art technology has the limitation that environmental pollution still exists due to the toxic gas generated in the step of hardening, heating and rolling the synthetic resin adhesive by crushing the leather waste and using the synthetic resin adhesive to produce the recycled leather sheet.

Generally, in the field of leather processing, tannery treatment is a very important stage, usually leather. Shades are used for achieving colored leather, which includes tannery process with tannery chemical. Leather finishing is a full process in which so many chemical used in tannery for processing leather from wet blue to finish Leather. In the process of tanning so many chemical water is used to make final finish leather but in the present invention, only glue is used for making leather sheet.

There are so many leather wastage and scrap which cannot be used as it is like leather to make any leather product. Only leather dust is made from waste which is used for making sole of the shoe.

KR101752176B1 relates to a method of manufacturing a leather sheet, and more particularly, to a method of manufacturing a reclaimed leather sheet made of leather waste. A method of manufacturing a recycled leather sheet using leather fibers comprises the steps of: performing a pretreatment process of neutralizing leather waste and adhering an edible material; Separating the leather fibers from the pretreated leather waste; Fusing the separated leather fibers and fibers for improving the tensile strength of the separated leather fibers; And combining the mixed fibers with a bottom support to form a sheet. As described above, by using the method for producing a recycled leather sheet of the present invention, recycled leather sheets can be produced by physical bonding without using an adhesive, thereby minimizing environmental pollution.

KR20170096093A relates to a composite material including a biofabricated material and a second component. The second component may be a porous material such as paper, cellulose or a sheet for fabric coated by or coming in contact with the biofabricated material. The biofabricated material comprises a uniform network of cross-linked collagen fibril, thereby providing strength, elasticity and aesthetic appearance of the composite material.

KR101584171B1 relates to a method for manufacturing a sheet material for a fashion material based on a reclaimed leather manufacturing technique using a wet-dry manufacturing method. More specifically, chrome-containing wastes generated during the leather manufacturing process and physical and chemical treatments such as beater, mixing, and the like are separated and separated from waste fibers inevitably generated during the working process by the textile manufacturer (Latex, PU binder, EVA emulsion, Acrylic binder, etc.) are added to form a fiber-to-fiber bond, followed by wet-dry mixing A method for producing a sheet material for a fashion material by the method, and finally, a material having excellent thickness, flexibility, tensile strength, and tear strength suitable for fashion materials can be manufactured.

KR101996175B1 relates to a method for manufacturing lightweight foamed reclaimed leather for uppers of safety shoes according to the present invention comprises the following steps of powdering collagen fiber waste generated to control the thickness of leather during a leather making process; neutralizing a resultant product of the previous step by treating the resultant product by soda ash with water and a neutralizing agent, treating the resultant product of the previous step with a dyeing and a branching process; mixing the resultant product of the previous step with latex, a dispersing agent, a coagulant, and thermally expandable microspheres; inserting a coagulant to the resultant product of the previous step to coagulate collagen fiber powder and latex, drying the resultant product of the previous step through hot air drying after vacuum dehydration and roll press compression dehydration; and foaming the thermally expandable microspheres by applying high temperature heat treatment to the resultant product of the previous step so as to grant functionality to reclaimed leather.

In view of the foregoing discussion, there is a need for a simple and efficient process of converting a waste leather scrap into a leather sheet.

OBJECTS OF INVENTION

The primary object of the present invention is to re-use leather scrap and leather wastage by mixing with glue to give an esthetic and sustaining look to the product.

It is another object of the present invention is to simplify the process of making leather sheets by using leather scrap and leather wastage.

It is another object of the present invention to provide a process of using leather wastage and leather scrap with the help of glue mixing and compressing.

SUMMARY OF THE INVENTION

One or more of the problems of the conventional prior art may be overcome by various embodiments of the present invention.

It is the primary object of the present invention to provide a process of converting a waste leather scrap into a leather sheet using biodegradable water-based glue.

It is another object of the present invention to re-use leather scrap and leather wastage by mixing with glue to give esthetic and sustain look of the product.

It is another object of the present invention to simplify the process of making leather sheet used by leather scrap and leather wastage.

It is another object of the present invention to improve the nature law of Sustainable.

It is another object of the present invention to use all kind of leather scrape and leather wastage to make leather sheet to improve our law of nature.

It is another object of the present invention to save environment in terms of nature law.

It is another object of the present invention to provide a process of converting a waste leather scrap into a leather sheet using biodegradable water-based glue, comprising of steps:

- collecting of leather scraps;
- cutting the collected leather scraps into small pieces;
- mixing a glue with the small pieces of leather scrap;
- spreading in particular size metal frame;
- forming a leather scrap cake by compressing the spread leather scrap using a hydraulic compressor;
- drying the leather scrap cake for a period of 1 to 2 hours in a heat chamber at a temperature of 45-to-60 degrees Celsius;
- compressing the dried leather scrap in the hydraulic compressor at a temperature of 40 degrees Celsius;
- drying the leather scrap cake for a period of 4 to 5 hours at room temperature; splitting of the leather scrap cake into a predetermined thickness;
- applying backing (reinforcement) as per the requirement to make the leather product;
- forming of the final leather sheet; and
- drying the leather sheet for a period of 2 to 3 hours,
- wherein the mixing glue is glue (SW-22), a bio-degradable water-based chemical.

It is another aspect of the present invention, wherein the thickness of leather scrap cake is in the range between 6 mm and 8 mm.

It is another aspect of the present invention, wherein the thickness of the final leather sheet is in the range of 1.2 mm and 1.4 mm.

It is another aspect of the present invention, wherein the metal frame size is one square feet (30×30 cm).

BRIEF DESCRIPTION OF THE DRAWINGS

The manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

DESCRIPTION FOR DRAWINGS WITH REFERENCE NUMERALS

Figure 1A:
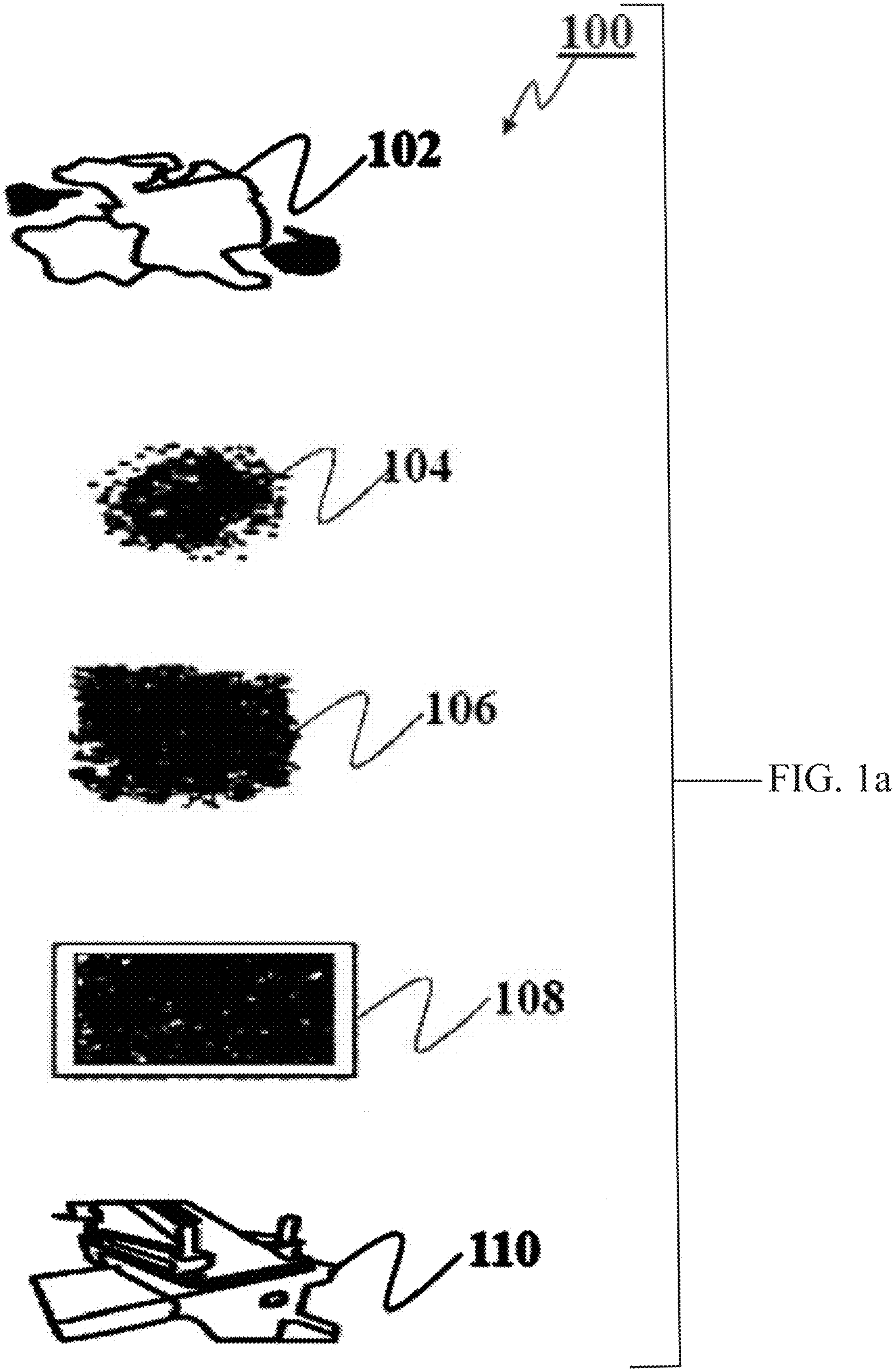
FIGS. 1*a* and 1*b*: illustrates the flow diagram of the process of converting a waste leather scrap into a leather sheet using biodegradable water-based glue according to the present invention.

[102] Leather Scrap
[104] small cut Pieces
[106] Mix with glue
[108] Spread in metal frame
[110] Compress in hydraulic compressing machine
[112] Drying in heat chamber
[114] Compressing in heat condition with hydraulic compressing machine
[116] Natural drying
[118] Splitting
[120] Final leather sheet

DETAILED DESCRIPTION OF THE INVENTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The present invention relates to a process for re-using scrap leather. More particularly, the present invention relates to the process of converting a waste leather scrap into a leather sheet using biodegradable water-based glue and compression process. Advantageously, the present invention effectively saves time and wastage of leather and save environment from the pollution.

The present invention relates to scrap leather re use which is fully based on Sustainable. And the process for enhancing leather wastage and scrap into beautiful leather product. Further, the present invention able to make any leather scrap into leather sheet from 0.9 mm thickness to 6 mm thickness. The present invention is fully based on Sustainable in which the process from leather scraps to finish leather sheet and its 0% wastage.

The process of converting a waste leather scrap into a leather sheet using biodegradable glue is unique and very fast process which is used to make leather sheet from the scrape Leather and waste Leather which is rejected from the leather company. In the present invention, all kind of leather product is used because its leather sheet can use like leather and bag, belt, shoe small leather bag and all kind of leather product can be manufactured from the obtained leather sheet.

The present invention is based on 0% wastage in which making leather sheet is made out of leather wastage and if we are getting any wastage while making leather sheet those waste is also re used and making the process fully sustainable.

Figure 1B:
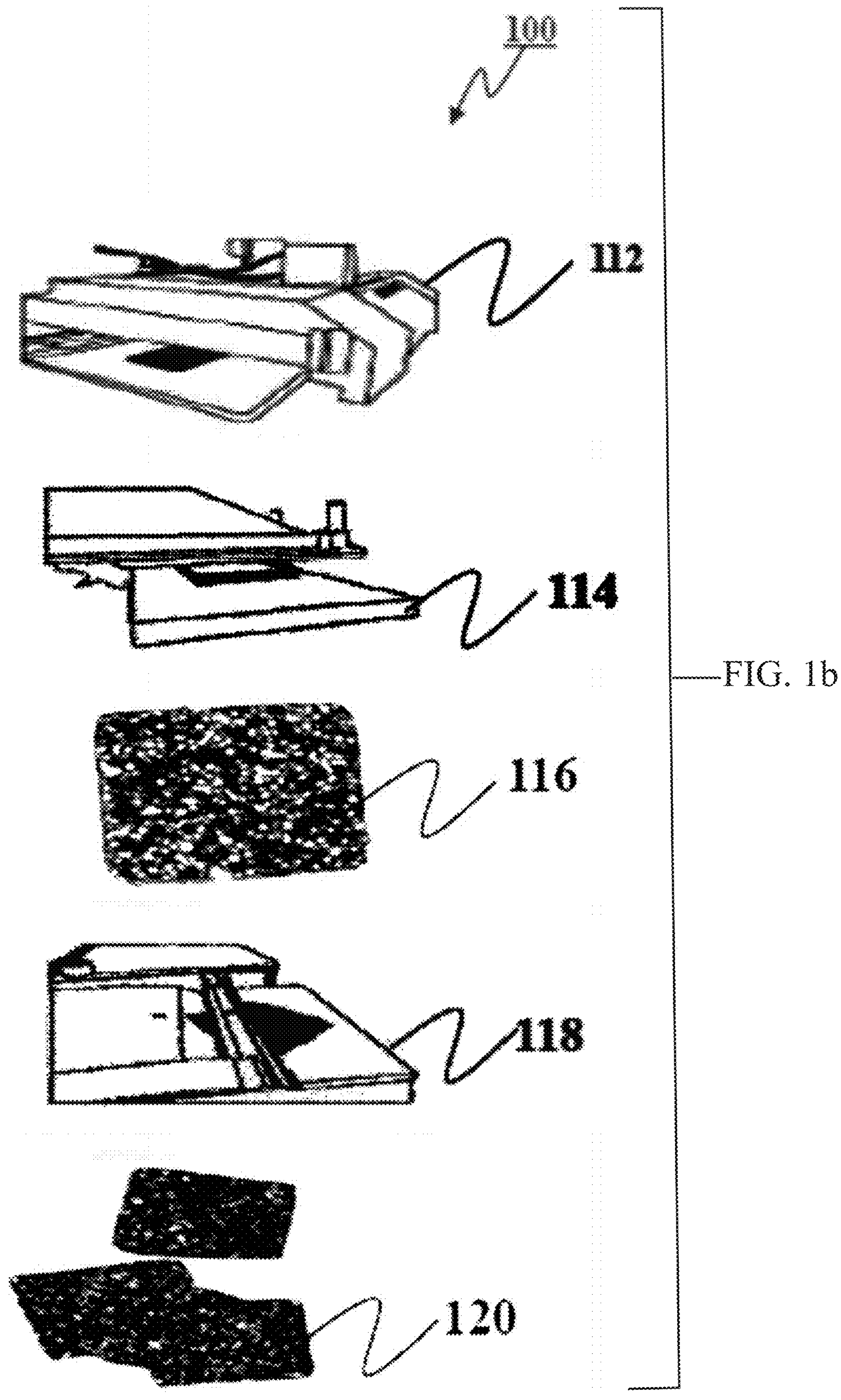

FIGS. 1*a* and 1*b*: illustrate the flow diagram of the process of converting a waste leather scrap into a leather sheet using biodegradable water-based glue according to the present invention.

Fig. la illustrate the steps of converting a waste leather scrap into a leather sheet using biodegradable water-based glue, in accordance with an embodiment of the present invention. In the first step [102], collect leather scraps from the production team, and in the second step [104] cut the collected leather scraps into small pieces, third step [106] mix glue with small pieces of leather scrap, in the fourth step [108] will be spread in particular size metal frame wherein the metal frame size is 30/30 cm, in the fifth step [110] spread in metal frame compressing the spread leather scrap in a hydraulic compressing machine and making 6 mm to 8 mm cake of leather scrape, in step six [112] drying the leather scrap cake for a period of two hours in a heat chamber [[in]] at a temperature of 45 degrees Celsius and in the step seven [114] again compressing in heat condition with hydraulic compressing machine, in step eight [116] drying the leather scrap cake for a period of 4 to 5 hours at room temperature, in step nine [118] splitting of the leather scrap cake into required thickness, apply backing (reinforcement) as per requirement to make leather product and finally the formation of final leather sheet [120] and drying the leather sheet for a period of 2 to 3 hours for making bag or any leather product.

Figure 2:
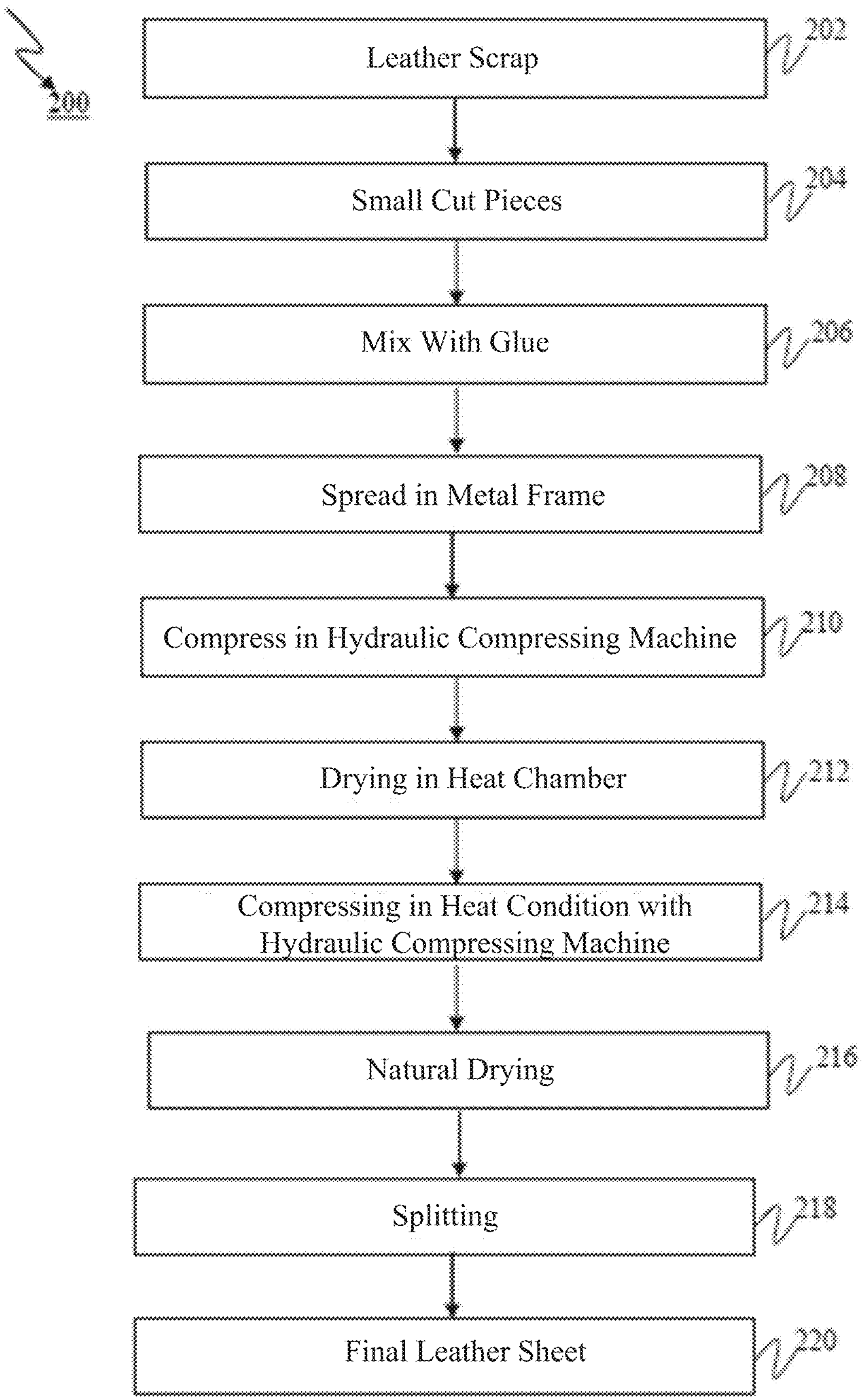
FIG. 2: illustrates the flow chart of the process of converting a waste leather scrap into a leather sheet using biodegradable water-based glue according to the present invention.

Fig.2 illustrates the flow chart of the process of converting a waste leather scrap into a leather sheet using biodegradable water-based glue, in accordance with an embodiment of the present invention. The various steps involved to simplify the process of making leather sheet used by leather scrap and leather wastage, the main advantage of this invention is to re-use leather scrap and leather wastage mixed with glue to give esthetic and sustain the look of the product. Steps are involved to collect the leather scraps from the production team [202] and cut into small pieces [204], mix glue with small bits of leather scrap [206] and compress in the hydraulic compressing machine, and make 6 mm cake of leather scrap [208] and then the leather scrap cake has to put in heat chamber at a temperature of 45 degrees Celsius two hours for good bond [210] and then again compress in hydraulic compressing machine [214] and drying the leather scrap cake for a period of 4 to 5 hours at room temperature [216] splitting of the leather scrap cake into required thickness [218]; applying backing (reinforcement) as per requirement to make leather product and finally forming of final leather sheet [220]. Drying the leather sheet for a period of 2 to 3 hours for making the bag and any leather product.

The composition on ingredients of the glue (SW-22), is tabular below:

| Hazardous Components CAS Number | EC number | Content | Classification |
|---|---|---|---|
| Acetone 64-67-1 | 200-662-2 | >=0.1-<=10% | F—Highly flammable: R11 Xi—irritant: R36 R66 R67 |
| Fatty alcohol ethoxylate C12 9002-92-2 | 500-002-6 | >=0.1-<=5% | Xi—Irritant: R41 |
| Isophorone diisocyanate polymer with methoxypolyethylene glycol | | >=0.1-<=5% | Xi—Irritant: R37, R43 |

-continued

| Hazardous Components CAS Number | EC number | Content | Classification |
|---|---|---|---|
| 130341-32-1 2-Methyl-1,2-benzisothiazol-3(2H)-one 2527-66-4 | | <=0.1% | T—Toxic: R25 C—Corrosive: R34 Xn—Harmful: R20/21 Xi—Irritant: R43 N—Dangerous for the environment: R50 |

The appearance of the glue (SW-22) is a milky white liquid, and the viscosity of the glue is 4.000-7.000 cp4.500-5.500 cp.

The present invention is clearly advantageous invention effectively saves wastage of leather and saves the environment from pollution.

I claim:

1. A process of converting a waste leather scrap into a leather sheet using biodegradable water-based glue, comprising:

collecting of leather scraps;

cutting the collected leather scraps into small pieces;

mixing a glue with the small pieces of leather scrap;

spreading a metal frame, forming a leather scrap cake by compressing the spread leather scrap using a hydraulic compressor;

drying the leather scrap cake for a period of 1 to 2 hours in a heat chamber at a temperature of 45-60 degrees Celsius;

compressing the dried leather scrap cake in the hydraulic compressor at a temperature of 40 degrees Celsius;

drying the leather scrap cake for a period of 4 to 5 hours at room temperature;

splitting the leather scrap cake into a predetermined thickness;

applying a reinforcement backing to the split leather scrap cake to form a leather sheet; and drying the leather sheet for a period of 2 to 3 hours, wherein the glue is a bio-degradable water-based chemical glue.

2. The process of converting a waste leather scrap as claimed in claim 1, wherein the thickness of the leather scrap cake is in a range of 6 mm to 8 mm.

3. The process of converting a waste leather scrap as claimed in claim 1, wherein the thickness of the final leather sheet is in a range of 1.2 mm to 1.4 mm.

4. The process of converting a waste leather scrap as claimed in claim 1, wherein the metal frame size is one square foot (30×30 cm).

* * * * *